(12) United States Patent
Porat et al.

(10) Patent No.: US 8,503,305 B2
(45) Date of Patent: Aug. 6, 2013

(54) AUTOMATIC SIGNALING METHOD AND DEVICE FOR TELECOMMUNICATION SERVICES

(75) Inventors: Hayim Porat, Tel-Aviv (IL); Marina Lipshteyn, Petah-Tikwa (IL)

(73) Assignee: Tejas Israel Ltd, Herzelia Pituach (IL)

( * ) Notice: Subject to any disclaimer, the term of this patent is extended or adjusted under 35 U.S.C. 154(b) by 340 days.

(21) Appl. No.: 12/477,734

(22) Filed: Jun. 3, 2009

(65) Prior Publication Data

US 2010/0002722 A1    Jan. 7, 2010

(30) Foreign Application Priority Data

Jun. 3, 2008 (IL) .......................................... 191927

(51) Int. Cl.
*H04L 12/66* (2006.01)

(52) U.S. Cl.
USPC ......................................... 370/236; 370/352

(58) Field of Classification Search
USPC .............. 370/229, 238, 236.2, 248, 352, 392, 370/401; 709/223, 226, 238, 239, 242
See application file for complete search history.

(56) References Cited

U.S. PATENT DOCUMENTS

| | | | |
|---|---|---|---|
| 5,875,238 A | 2/1999 | Glitho et al. | |
| 6,014,379 A * | 1/2000 | White et al. | 370/389 |
| 6,292,481 B1 * | 9/2001 | Voit et al. | 370/352 |
| 6,516,195 B1 | 2/2003 | Zadeh et al. | |
| 2003/0118037 A1* | 6/2003 | Lee | 370/401 |
| 2005/0157750 A1* | 7/2005 | Rabie et al. | 370/466 |
| 2005/0169279 A1* | 8/2005 | Magd et al. | 370/395.5 |
| 2006/0039391 A1* | 2/2006 | Vasseur et al. | 370/409 |
| 2006/0101142 A1* | 5/2006 | Vasseur et al. | 709/225 |
| 2006/0171320 A1* | 8/2006 | Vasseur et al. | 370/238 |
| 2006/0182034 A1* | 8/2006 | Klinker et al. | 370/238 |
| 2006/0182035 A1* | 8/2006 | Vasseur | 370/238 |
| 2006/0198308 A1* | 9/2006 | Vasseur et al. | 370/238 |
| 2007/0208871 A1* | 9/2007 | Vasseur et al. | 709/230 |
| 2008/0049621 A1* | 2/2008 | McGuire et al. | 370/236.2 |
| 2008/0062994 A1 | 3/2008 | Porat | |

* cited by examiner

*Primary Examiner* — Michael Thier
*Assistant Examiner* — Prince A Mensah
(74) *Attorney, Agent, or Firm* — Deborah Gadop

(57) ABSTRACT

A method includes receiving by a first inter network interface (INI) a control message from an entity in a first network, the first INI being located at a border between the first network and networks external to the first network. The first INI translates the control message from a first format used internally in the first network to a second format used to communicate between the first INI and a second INI located at a border between a second network and networks exterior to the second network. The first INI then transmits the translated control message to the second INI. The method can also include translating, by the second INI, the received control message from the second format to a third format used internally in the second network, and forwarding the received and translated control message to an entity in the second network.

25 Claims, 7 Drawing Sheets

AUTOMATIC SIGNALING METHOD AND DEVICE FOR TELECOMMUNICATION SERVICES

CROSS-REFERENCE TO RELATED APPLICATIONS

This application claims priority under 35 U.S.C. §119 to Israeli Patent Application No. 191927, with inventors Hayim Porat and Marina Lipshteyn, filed on Jun. 3, 2008 and entitled "Automatic Signaling Method and Device for Telecommunication Services," which is herein incorporated by reference in its entirety.

BACKGROUND INFORMATION

Existing telecommunications networks are hybrids of circuit and packet switched networks. They are also hybrids of wireless and wire line networks. Today there is a demand for converged networks that are multi-domain, multi-carrier and multi-technological. A connection may be established end-to-end from one network to another going through several other networks on its way. It will be appreciated that, as used herein, the term domain can refer to a network. Today there is an emerging need for inter-carrier technology and architecture which coordinates demand and supply between carriers, enables fast end-to-end provisioning based on control plane in-band signaling and inter-domain visibility, provides automatic unified authentication, authorization and security mechanisms for inter-carrier services, and enables an automatic unified billing mechanism for inter-carrier services. According to this architecture, such a network should be resilient, robust and scalable.

U.S. Pat. Nos. 6,516,195 and 5,875,238 deal with handover and billing in a cellular network. U.S. Pat. No. 6,516,195 describes a method and system for optimizing mobile telecommunications networks utilizing geographical positioning information. Initially, a particular telecommunications event, such as a handover event, call set-up event, a dropped call event, or a high bit error rate event, is designated, such that an occurrence of the particular telecommunications event automatically triggers geographical positioning of a mobile unit within a mobile telecommunications network. A geographical positioning request is then transmitted to a mobile location center within the telecommunications network, in response to an occurrence of the particular telecommunications event. Thereafter, geographical positioning information associated with the particular telecommunications event and the mobile unit is determined, in response to the transmission of the geographical positioning request to the mobile location center.

U.S. Pat. No. 5,875,238 describes a telecommunications switch serving a roaming mobile station, which transports the resulting billing records by setting up a communication link with an administrative billing center connected to a Signaling System No. 7 (SS7) telecommunications network by utilizing Transaction Capabilities Application Part (TCAP) signals.

U.S. Pat. No. 6,292,481 describes an inter-carrier signaling and usage accounting architecture for Internet telephony. A communication system providing telephony communication across combined circuit switched and packet switched networks, such as a telephone network and the Internet, provides an architecture and methodology for handling resource allocation, settlements, usage accounting, and usage allocation among carriers or service providers. This patent relates to establishing a phone call between domains of circuit and Internet Protocol (IP) data protocols.

U.S. Pat. No. 6,014,379 describes a telecommunications system wherein the dialing of a directory number, which has been forwarded, triggers an intelligent network signal which is directed to the Internet. The signal is transmitted through the Internet to a database in the Internet, where a forwarding number for the forwarded number is obtained. The database returns call set up directions which are used by the originating switching system to establish a voice link from the calling station to the station having the forwarded number. In another embodiment, where a number has been forwarded to a station that is connected only to the Internet, the Internet database may provide a domain name address. This address is then used to establish a link through the Internet between the calling and called station. In this instance, the Internet handles both the signaling and the voice connections.

However, all these patents deal with telephone call services in different technologies and multiple carriers. These services are point-to-point services, have a well-defined, unique Quality of Service (QoS) definition and a unique agreed upon addressing scheme (E.164, of the Telecommunication Standardization Sector of the International Telecommunication Union (ITU-T)). These patents do not provide a mechanism to assure QoS in each network, such that service end-to-end QoS requirements, as set forth in Service Level Agreements, are met. Conventional telephone addressing schemes cannot be used for general data services. Thus, these patents do not provide a global unique addressing scheme.

In addition to the patents described above, there is known a framework IPSphere that deals with inter-domain and inter-carrier services. The IPSphere is a framework for abstracting and composing multi-stakeholder telecommunications-based services both within and between service providers. However, IPSphere functions between Management Systems of owners of the network elements and Management Systems of the service providers. This framework is slow and not-automatic, since it operates on the management plane. The exchange of information among the management systems, and between management systems and network entities, is slow. In addition, this framework assumes a centralized management structure, where an administrative owner configures all the services through the management systems of the element owners. Implementation of this framework is not realistic in huge inter-carrier international networks, where services must be scalable and, hence, distributed service management is needed.

Another framework is known for providing inter-domain connectivity between Autonomous Systems (ASs), known as Border Gateway Protocol (BGP). Internal routing protocols are used inside each AS but cannot be used between ASs, because there is too much data to exchange. Also, some ASs do not trust each other and do not want to exchange their full routing information. BGP is an external routing protocol that works between ASs, while there is one central router per AS. The border gateways in different ASs exchange routing info via BGP, which is independent of the routing protocol beneath. The routing info contains network topology and metrics. The BGP communication is based on TCP (Transport Control Protocol). The BGP works in a huge network with many destination addresses, therefore it uses route aggregation based on IP prefixes. If a carrier does not want to publish its information to the other carriers, then sometimes BGP is unable to select the best route for a service due to lack of information, and only configures a "loose" route between gateways (namely, defines only the entry device and exit device of the network and does not describe the whole path inside the network). Since BGP is based on IP, the addressing is based on IP addresses inherent in the protocol and the protocol does not give a solution for general technology with different addressing schemes. Moreover, BGP handles routing and connectivity only, without authentication, authorization, billing and resource allocation and management.

Another existing framework is the Path Computation Element (PCE)-based model for path computation in large, multi-domain inter-layer networks. A PCE is an entity that is capable of computing a network path or route based on a network graph, and of applying computational constraints during the computation. The PCE is an application that can be located within a network node or component or on an out-of-network server. PCE can be implemented in many ways: a router, external server, etc.

PCE is able to compute a path while preserving confidentiality across multiple Service Providers' cores. The service provider is not required to divulge any information about its resources or topology in order to support inter-carrier path computation, but PCE may return partial paths by means of loose hops. PCE architecture provides path computation functionality only.

An existing network that has a single technology, but is multi-domain and multi-carrier is the Common Channel Signaling System #7 (SS7). SS7 separates the information required to set up and manage telephone calls in the Public Switched Telephone Network (PSTN) onto a separate packet switched network (the Signaling Network) rather than using the same circuit switched network that the telephone call, itself, is made on (the Voice Network). All nodes in the SS7 network are called Signaling Points (SPs). Each SP is identified by a unique address called a Point Code (PC). SPs have the ability to read a Point Code and determine if the message is for that node and the ability to route SS7 messages to another SP.

In SS7, only a guaranteed point to point 64 k timeslot is allocated per session on a pre-provisioned trunk. SS7 does not support protection, assuming protection exists on the physical layer. The routers and/or gateways, known as Signal Transfer Points (STPs) are arranged in a flat hierarchy relative to one another. In SS7, the STP has only static routing functionality, which relies on pre-computed routes by an external agent. In SS7, the signaling points trust each other and do not authorize or authenticate between themselves. Finally, the SS7 deals only with a single technology, namely TDM phone circuits.

There is also known in the art an E-NNI (external Network to Network Interface) as defined by MEF (the Metro Ethernet Forum) and OIF (Optical Internetworking Forum). This is a definition of a special interface that connects two networks while enabling separation between certain aspects of the network's data. The E-NNI is a reference point where two service providers meet in support of specified MEF services. The E-NNI definition enables a framework for inter carrier connection but it lacks definitions for global addressing, and it does not support automatic signaling and it does not support end to end provisioning, as its scope is only between two adjacent interfaces and not end to end.

SUMMARY

A fast, real-time automatic mechanism is provided to perform signaling by sending control information and provisioning, which may include connectivity, resource allocation and management, authentication, authorization, billing and safety for services, which is implemented in inter-network telecommunication networks that may involve a single carrier or several carriers. Creation of services is enabled, not only for telephone calls, but for any data services (for example, Ethernet services) that may have a multipoint structure and various Service Level Agreement (SLA) profiles. In a general case, an end-to-end service may cross several networks, where each network may be of any technology. Each network may have different QoS mechanisms and profiles, while the service has an end-to-end QoS requirement defined in its SLA. Each network may be a network of a single telecommunication technology (i.e., a single protocol): for example, circuit, IP, TDM, MPLS, Ethernet, etc.

It will be appreciated that each network is an autonomous system (AS). A network includes at least one network entity, and typically is a connected set of at least two network entities, that either forwards or switches data. The network entities are controlled and managed through a management entity (e.g., a Network Management System (NMS) server, an Operations Support System (OSS), an Element Management System (EMS), etc).

A carrier is a single owner of a network domain or domains who manages and administers the domain(s). Each network has a data plane (users' data), a control plane (control information, also known as signaling) and a management plane (the operations and administration traffic required for network management). The signaling can be in-band.

A method of end-to-end signaling between a first network and a second network is provided, embodiments of the method including identifying networks topology, determining an end-to-end path over the topology between a source in a first network to a destination in a second network, and automatically provisioning an end to end telecommunication service over that path using distributed, in-band signaling. In particular, provisioning herein can include updating forwarding data bases or routing tables of network switching devices with a specific address set. One example is defining the mapping between a MAC address of a received frame to a destination port in an Ethernet bridge.

An apparatus called an Inter-Network Interface (INI) is provided that can be used at every border of each Autonomous System. The carrier configures the authorization, authentication and billing databases utilized by each INI. According to exemplary embodiments of the invention, this interface is an E-NNI (External Network to Network Interface), as defined by MEF (Metro Ethernet Forum) with the added functionality of automatic signaling via support of the control plane and addressing, as described herein below. One assumption can be that each network has its own intra-network control method. The INI can be agnostic to this method; it is based either on network management or on internal technology dependent protocols. However, the INI, being a network entity in the network, is also capable of supporting the control plane in its network.

A technology-independent control plane between the INI entities is provided, which can include connectivity, resource reservation and management, authentication, authorization and billing. Exemplary requirements and functionality for such a control plane are defined below, together with an exemplary implementation of such a control plane. Nevertheless, this implementation is only exemplary, and not limiting.

A global unique addressing scheme is provided. This can be accomplished by utilizing a hierarchical Global Unique Identifier (GUID) for each network entity, for example, as assigned by an international Standards organization. The GUID has a hierarchical structure, which contains a list of fields. The fields can correspond to the network topology, i.e., the first field of the address indicating the number in a first network, the second field indicating the sub-network number in the network, and so on. If desired, one or more fields can indicate a specific carrier in a sub-network, i.e., not corresponding to topology. The last field can indicate the network entity inside a non-partitioned network. One possible implementation, similar to conventional telephony addresses, is that the first field indicates the continent or the country of an entity, the second field indicates the Metro Area Network (MAN) inside the country or a continent, the third field indicates the Local Area Network (LAN) inside the MAN and the last field indicates the network entity inside the LAN.

BRIEF DESCRIPTION OF THE DRAWINGS

So that features and embodiments can be understood, a number of drawings are described below. However, the appended drawings illustrate only particular embodiments and are therefore not to be considered limiting of scope.

DETAILED DESCRIPTION OF EXAMPLE EMBODIMENTS

Figure 1:
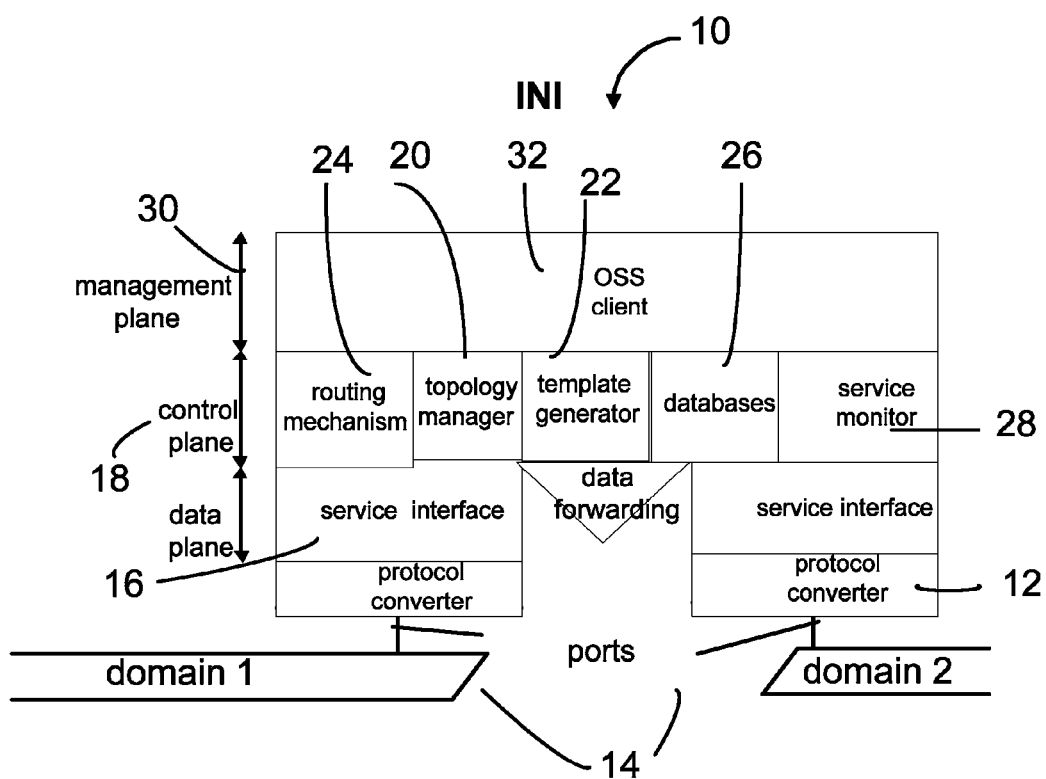
FIG. 1 is a schematic view of the components of an INI architecture, according to one embodiment.

Example embodiments of fast automatic signaling between a source in a first network and a destination in a second network, and through any networks therebetween, are provided. Exemplary signaling can include requests and responses to requests for connectivity, resource reservation and management, authentication, authorization and billing capability for multi-network, multi-carrier and multi-technological telecommunications networks. Each network is referred to as an Autonomous System (AS). This term can refer to one network in a network environment. For purposes of the present application, an AS is a network domain of a single technology (a single data protocol) and a single carrier. Example embodiments of an apparatus called an Inter Network Interface (INI) are provided on each border port between networks. In particular, an INI can be located at each border between a network and a network or networks external to that network.

A method of end-to-end signaling between a first network and a second network in a network is provided, embodiments of the method including identifying a network topology, determining an end-to-end path over the topology between a source in a first network to a destination in a second network, and automatically provisioning an end to end telecommunication service over that path using distributed, in-band signaling. Provisioning herein can include updating forwarding data bases or routing tables of network switching devices with a specific address set. One example is defining the mapping between a MAC address of a received frame to a destination port in an Ethernet bridge. Thus, a mechanism can be provided to assure QoS in each network, such that service end-to-end QoS requirements (SLAs) are met.

An example global unique addressing scheme is also provided. INI entities can be organized in a logical hierarchical structure derived from their GUID. INIs that have different first fields are in the first level of hierarchy and define the first hierarchical partition of the network. INIs that have an identical first field, but a different second field are on the second level of hierarchy and define the second hierarchical partition of one of the parts obtained after the first hierarchical partition.

The signaling between INIs is based on information exchange and, therefore, an inter-INI data exchanging control plane between interfaces of coupled INIs must be defined. An INI is capable of processing the control signaling and the functionality local to its network, but it also receives and sends the inter-INI control plane messages.

One such inter-INI control plane can be based on messaging over some packet technology and another possibility is that it is based on SS7 control plane protocol. Other communication protocol implementations of the inter-INI control plane are possible.

In addition, example embodiments herein can utilize a plurality of data templates. Each network typically has such a network template, which contains the a priori defined capability description of the network. Also, for each service request, a pre-defined template can be used.

Example embodiments discussed herein can operate without making an assumption as to whether network management of each network, or of some of the networks, exists or not. The existence of an organization entity that manages the GUID for all networks can typically be assumed, however. The network organization can publish the service and network templates either via control plane, management plane or DCN (Data Communications Network). DCN is an out-of-band network based on the configuration of telecommunication facilities for the purpose of transmitting data, as opposed to analog signals. DCN provides connectivity between network elements and their respective operations support systems (OSSs).

The following architectural modules can form an exemplary embodiment of the INI entity. Other embodiments of the INI can include a subset of the following modules. The following modules, or subsets thereof, can be implemented in the INI by a processor and a memory, the processor configured to access and execute program instructions to perform the module functionality described herein, and the memory configured to store the program instructions and any other data stored by the INI.

Protocol converter: this module converts the internal network protocol to the inter-INI protocol, and vice versa. The conversion is carried out on both the control plane and data plane. If the INI is on a border between networks using the same protocols, the function of protocol conversion of the data can be reduced to tag (protocol specific information) translation from the protocol of one network to the protocol of the other network.

Template generator: this module generates, receives and processes the service template and/or the network capabilities template and distributes them in the network. Upon a change in service, topology or network capabilities, this module generates updated templates to be sent via the control plane to other INIs.

Topology manager: This module is responsible for discovering the topology of various possible paths through the network. The topology includes the network resources and path metrics. The updated information obtained by this manager can be transferred via the control plane to all corresponding INIs.

Routing mechanism: this module provides a path calculation per service request. This can include calculation of an alternative protection path, if needed. The routing mechanism is also responsible for service restoration, i.e., switching over to the alternative path upon service failure. Finally, this module is also responsible for resource reservation for a service.

Service monitor: this module monitors every service passing through the INI, by keeping the billing records and using fault detection mechanisms for restoration or for a tear-down trigger.

Databases: Each INI can include the following databases, which are configured by the management system at the time of system set-up and are updated by the management system when changes occur. Whenever an INI updates one of its internal databases (e.g., service creation for a specific customer), it can update and synchronize the information with the other INIs in its network, using the control plane, and with the OSS, via the management plane.

Link State database, which is also updated by the control plane. This database stores the network topology and metrics for routing purposes.

Authorization and authentication databases, which are configured by the network management system. These databases contain a list of entities permitted to connect to each INI and authorization details of each one of the entities, if needed.

Tariff database, which is configured via the management system. This database contains the tariff information regarding services to entities on the same hierarchy level and on one hierarchy level higher.

Active services database, which contains a list of all services currently provisioned at this specific INI.

Templates database, which stores the filled templates on this INI.

Billing records database, which contains a record of all events associated with a specific service, such as time of use, total data transferred, SLA adherence, etc.

OSS (Operations Support System) client: this module serves as an OSS client, including data synchronization with the OSS.

Service interface: this module handles the control plane processing.

FIG. 1 shows a schematic view of components of an example embodiment of the architecture of an INI 10 disposed on the boundary between a network 1 and a network 2. INI 10 includes a protocol converter 12, which is the module that converts data received from at least one network interface 14 in the INI, according to a defined protocol. Protocol converter 12 is coupled to a service interface module 16. The converted data arrives to the service interface module 16, which processes the data and either forwards it to another interface of the INI or moves it up for processing in the control plane 18. It will be appreciated that service interface 16 includes an instance for each active service. The topology manager 20, template generator 22, routing mechanism 24, databases 26, and service monitor 28 handle the data in the control plane 18. The OSS client 32 handles the data in the management plane 30.

Each network may have any technology. We can typically assume that each network has its own control plane signaling, including connectivity, resource reservation and management, authentication, authorization, and billing capabilities. All these capabilities are input into a pre-defined template. The template can be defined by a global network organization, for instance one of the Standards committees. The network owner is responsible for filling the template. This can be done at the configuration stage of the INI. The network typically cannot be active until such a template is completed. For example, if a network requires no user authentication, then that is indicated in the template. Each network also has a topology discovery mechanism, which, for example, can be based on a centralized network management system, or can be distributed on the network entities in the network, or other. Each INI on the border of this network can be aware of the network topology and connectivity inside the network.

In some cases, the carrier does not wish to reveal the network topology or other network capabilities (e.g., resources, full tariff list, topology and so forth) to other carriers. It will be appreciated that the INIs communicate via the inter-INI protocol, permitting optimal end-to-end provisioning while internal data of the networks remains confidential. According to one exemplary embodiment, a PCE entity can be defined at each INI of such a network to provide path computation functionality without requiring or divulging internal knowledge of the networks. In this way, the PCE entity knows the topology of both neighboring networks, but the two of them do not know the topology of each other. Thus, privacy and confidentiality between the networks can be maintained.

The control plane communication between INIs is typically permitted only after authorization and authentication. This means that, first, authentication of the requesting and responding INI is exchanged, indicating that each INI is entitled to communicate with the other and request services. Then, it is determined whether the specific service request is authorized, i.e., the pre-defined authorization privileges of the requesting INI include the requested service. The authentication is used between INIs in order to authenticate any service request and can be based on conventional methods, e.g., Message Digest algorithm 5 (MD5). The information regarding keys and eligible users required for this authentication is configured into the authentication database by the management system. Optionally, the connection between the INI and the management system can also be encrypted, e.g., Simple Network Management Protocol (SNMP) version 3. Using the authentication and authorization information, each INI checks each service request against the authorization privileges of the requesting INI. The authorization privileges may include the capabilities of the services that this INI may request. The authentication and authorization databases can be updated each time a service is added or is deleted from the INI.

Signaling in the network is based on information exchange between INIs. Exemplary messaging over a packet technology will now be described. However, it will be appreciated that other types of data exchange can be used. Exemplary INI control plane messages of the following types can be supported:

Update message: An INI can send this message type to another INI when there is an update in one of its databases. For example: a new network is connected, a new service is created, a failure occurs in one element of the network, or a change occurs in the topology of any network. This message can include the GUID of the source INI and other relevant information, such as a network capability template, a change in user account, etc.

Path create message: The INI can send this message type to another INI to establish a service and a connectivity path. The message contains the requested connectivity definition: whether authorization is needed, what SLAs are required, whether high availability of the network is required, etc. This message is initiated by a source point and may be addressed to several destinations (multipoint service). When an INI receives a path create message with several destinations which must be sent to different destination interfaces in this INI, it generates a path create message per destination. If only some of the destinations are available for provisioning, the source INI decides whether or not to establish the service.

Path tear down message: An INI can send this message type to another INI to tear down a service and a connectivity path. This message is initiated by either the source network entity or destination network entity or the OSS.

Path recreate or restore message: An INI can send this message type to another INI to re-establish a service and a connectivity path. The message contains the requested connectivity definition: whether authorization is needed, what SLA is required, whether high availability of the network is required, etc. This message is initiated by a source point, following a service failure message, or alternatively by the INI that is adjacent to the failed part of the network.

Resource reservation acknowledgement: This message can be sent in reply to a path create message. The message describes the resources that the INI has reserved for the requested service.

Resource reservation delete: This message can be sent in reply to a failure of a path create message. The message causes an INI to free the resources allocated to a service.

Resource management message: This message indicates that a reserved resource has been successfully updated in accordance with a changed request.

Billing tariff or record: An INI can send this message to deliver a billing tariff to an INI in another network. Also, after the service has terminated, each INI along the path sends its record of the service to the INI in the originating network, for billing.

Authentication or Authorization request/response: A message the INI can send to another INI, before service setup, to request authentication or authorization, or to respond to such a request.

Keep Alive: This message can be sent periodically for each service, following the service path and, thus, verifying whether the connectivity is alive.

These INI messages can be sent throughout the network. Therefore, data path connectivity between INIs is typically needed. Therefore, each INI can have connectivity to all the other INIs in the same hierarchical level of its network and in the level directly above it. Tools for reliability of messaging can be utilized, e.g., obtaining acknowledgement of each message, resending messages upon failure or timeout, and periodic verification of aliveness of the connectivity. Alternatively, any other error control method can be employed.

Figure 2:
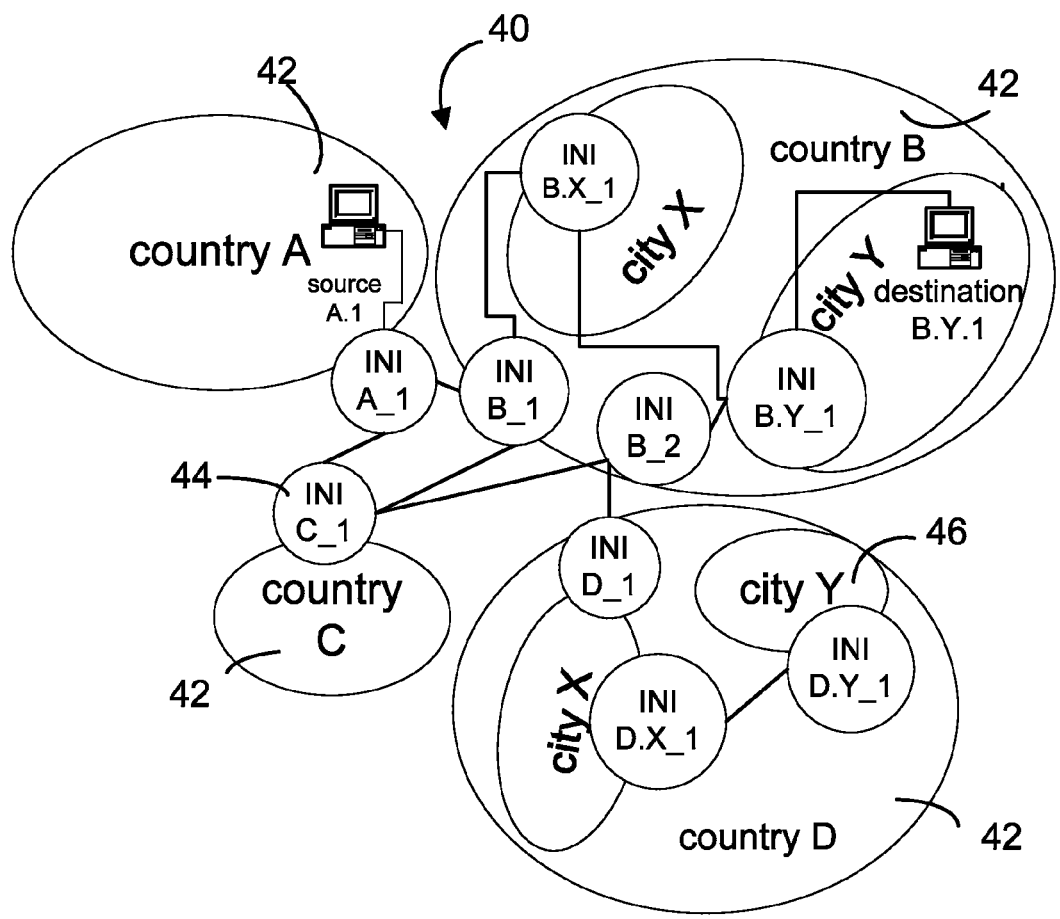
FIG. 2 is a schematic illustration of an exemplary embodiment of a network that is divided into hierarchical Autonomous Systems.

Referring now to FIG. 2, there is shown a schematic illustration of an exemplary network 40 which is divided into Autonomous Systems (AS) 42, which we also call domains, for simplicity. The end-to-end services whose paths are contained in a plurality of ASs are called inter-network services, since they involve more than one network. The endpoint devices of each inter-network link, i.e., on the boundaries between networks, have the INI functionality. While one INI device 44 may be connected to several networks on different links, there can be more than one INI device in a network. The embodiment of FIG. 2 shows exemplary division into countries 42 and cities 46. Each INI A__1, B__1, B__2, C__1, D__1 is in a first level of the hierarchy and can correspond to international interfaces. The other INIs BX__1, BY__1, DY__1, DX__1 are on the second level of the hierarchy and can correspond to intercity interfaces. There can optionally be more than one INI in one country. Each network entity (here, each INI and the source and destination entities) has a GUID. An authorized international Standards organization manages the GUID distribution on each hierarchy level. Entities in the same network have the same prefix in their GUIDs. This prefix can also be part of the GUIDs of the INIs in this network. One example of such a GUID is the E.164 telecommunication numbering plan addressing method used in telephone systems. The telephone numbers have a hierarchical structure indicating country, city, area and a specific physical location of the telephone.

Figure 3:
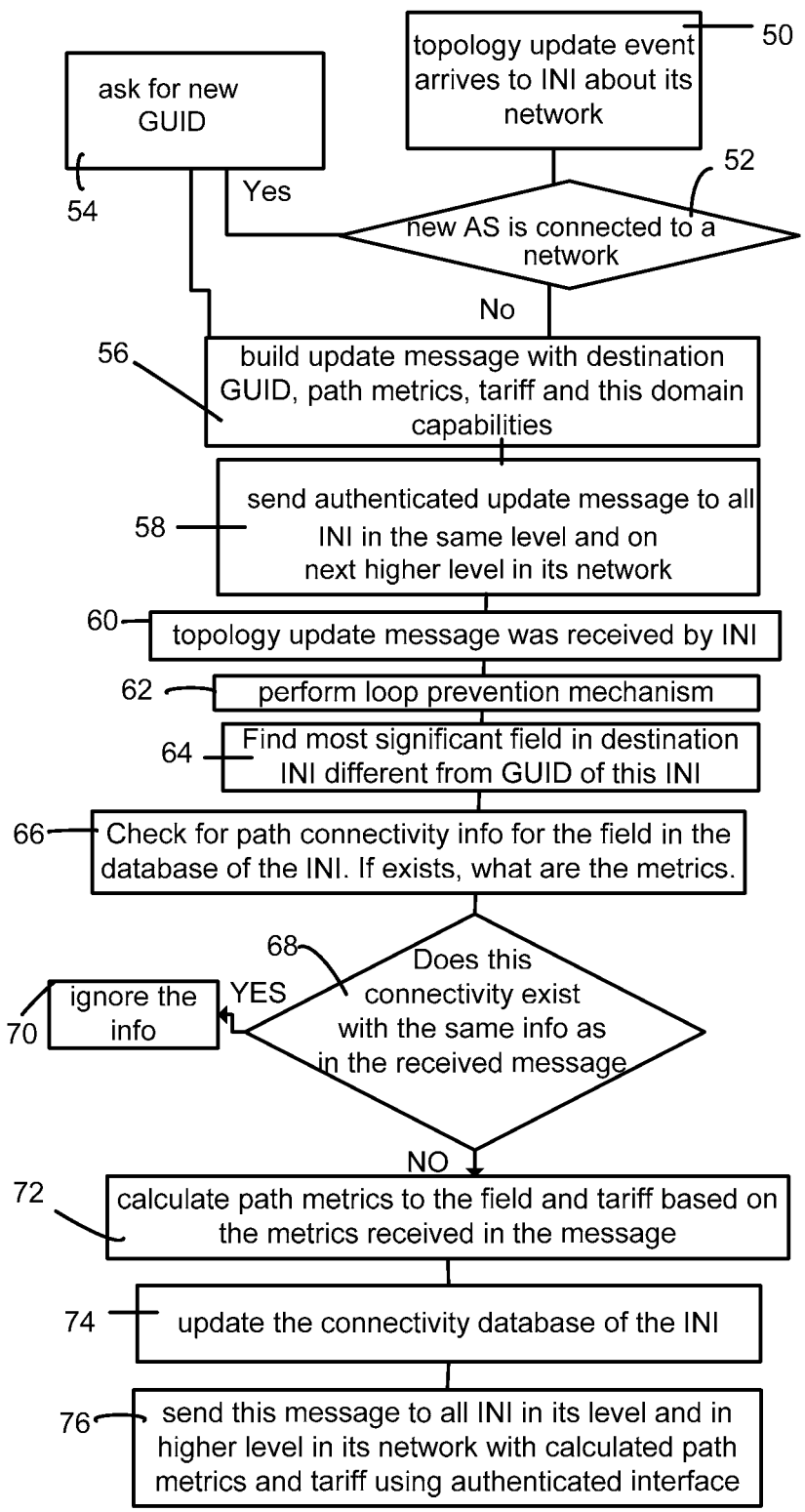
FIG. 3 is a flowchart of the operation, according to one embodiment, of the INI upon receiving topology update information from a network.

FIG. 3 is a flowchart of an example embodiment of the operations performed by the INI upon receiving notification of an update topology event from a network (as via a management system from another network entity in the network) and upon failures and other topology events in the network. When a topology update event for its network is received by an INI (block 50), e.g., a new AS is connected to a network or there is an update in an existing AS, the following steps can be performed. When the AS is a new network connected to a network (block 52), the owner of the new AS contacts the Standards organization that manages GUIDs and receives a GUID for that AS (block 54). The connection to the organization can either be performed via the management system of the INI or by external administration. The owner of the AS is responsible for the physical connection of the links only; all the other following steps below can be performed automatically.

Each INI can have connectivity information of all the INIs in the same hierarchical level in the network and of the INIs in the next higher level of the hierarchy. Each INI in the updated network can build an update message (block 56) which contains its GUID and network capabilities of its local network, as described in the network template. The update message can be authenticated and sent to all INIs in the hierarchy level of the originating INI and in the next higher hierarchy level in its network (block 58). The receiving INIs can send receipt acknowledgments (block 60).

In order to prevent loops in the network (block 62), one of the following two modes can be implemented. In one mode, each INI has full knowledge of its hierarchical level. In this case, it can work in a "link state" mode (e.g., similar to that used in OSPF and IS-IS protocols). Another possibility is that the update message will never pass more than a certain limited number of INIs, in which case it can work in a "vector state" mode (e.g., similar to that used in RIP protocol). The mode can be agreed upon in advance between the INI entities.

When an INI receives a topology update message, it reads the destination GUID and finds the most significant field in the GUID of the destination INI which is different from its own GUID (block 64). These fields indicate the branching in the hierarchy between the location of the receiving INI and the destination end point. The INI calculates the path metrics received in the message. The INI looks in its connectivity database to determine whether routing information to that field exists (block 66) and what path metrics and network capabilities appear in the database. If connectivity exists and the path metrics and the network capabilities are the same as those received in the topology update message (block 68), then the INI ignores the message (block 70). If connectivity exists but has different metrics or capabilities or the connectivity does not exist, then the INI calculates the new connectivity, path metrics and capabilities received in the message (block 72) and updates the connectivity database, accordingly (block 74). Then, the INI can send a topology update message (block 76) to all INIs in its hierarchical level and on the next higher hierarchical level using an authenticated interface.

In case two networks are operated by different carriers that are not interested in revealing information about path metrics to each other, a PCE entity can be utilized to which both INIs send their path calculation metrics using an authenticated method. Thus, they don't exchange this information with each other. Alternatively, other methods can be employed to maintain confidentiality.

Figure 4:
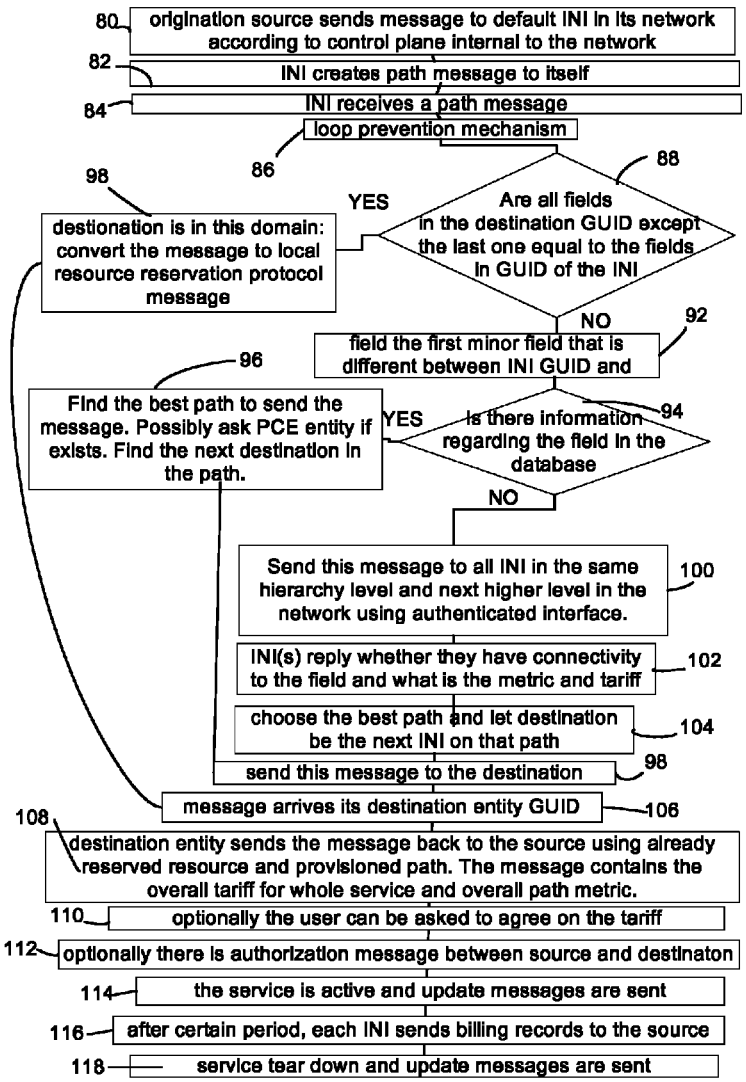
FIG. 4 is a flowchart illustrating establishing end-to-end services between different networks, according to one embodiment.

When a source network entity requests an end-to-end service to an endpoint in a different network, the following exemplary steps can be performed, as illustrated in the operational flowchart in FIG. 4.

(1) An originating source entity can send a service request message to the INI that is designated as its default INI during service creation in the network via internal control plane in the network (block 80).

(2) The INI receives the service requests in a template, which can include destination GUID, service ID and QoS requirements. The INI maps the data from the template from the internally used control plane to a path message, according to the inter-INI agreed upon protocol between the network interfaces of the two INIs, while adding its own GUID, path metrics and tariff to the message (block 82). The INI sends the message to the next INI in the service path.

(3) When an INI receives a path message (block 84), it can handle it as follows:

a. First, a loop prevention mechanism can be implemented (block 86). The INI finds the destination GUID in the message. If all the fields except the last one are the same as its own GUID (block 88), then the destination is in its network (block 90). Otherwise, it finds the most significant different field, which is now the key (block 92).

b. If the INI has information regarding the key (block 94), then the INI can choose the best path, possibly asking the PCE entity, if one exists, update the path metrics and tariff in the message and determine the next entity in the path (block 96). The INI now sends the updated message to the next entity in the path (block 98), optionally using an authenticated interface.

c. If the INI has no information regarding the key in its database (block 94), then it can update the path metrics and tariff and forward the message to all INIs on the same and the next higher level in the hierarchy, optionally using an authenticated interface (block 100). Each INI on the next higher hierarchical parent can reply whether it has information regarding the key and, if so, provide the path metrics and tariff (block 102). The INI chooses the best path and now sends a path message to the next INI on the best path (block 104), optionally using an authenticated interface.

(4) When the message arrives to the last INI in the path, the INI converts the message to an internal control plane message in that network and sends it to the destination entity (block 98) with the GUID of the source entity.

(5) Upon receiving the message (block 106), the destination entity can send a service acceptance and authorization message back, on the provisioned and reserved path, to the source (block 108)

(6) The path create reply message contains overall path metrics and an overall tariff and indicates that the service can be provided to that INI.

(7) When a message arrives at the source with the final tariff, optionally the user may be asked to agree to that tariff for that service (block 110).

(8) Optionally, authorization request and reply messages will be sent between source and destination, to authorize the service (block 112).

(9) The service is now allowed (block 114). At a determined period, a billing record message can be passed to the originating or intermediate INIs (block 116), according to the billing template.

(10) Each INI whose database changes can send an update message.

Figure 5:
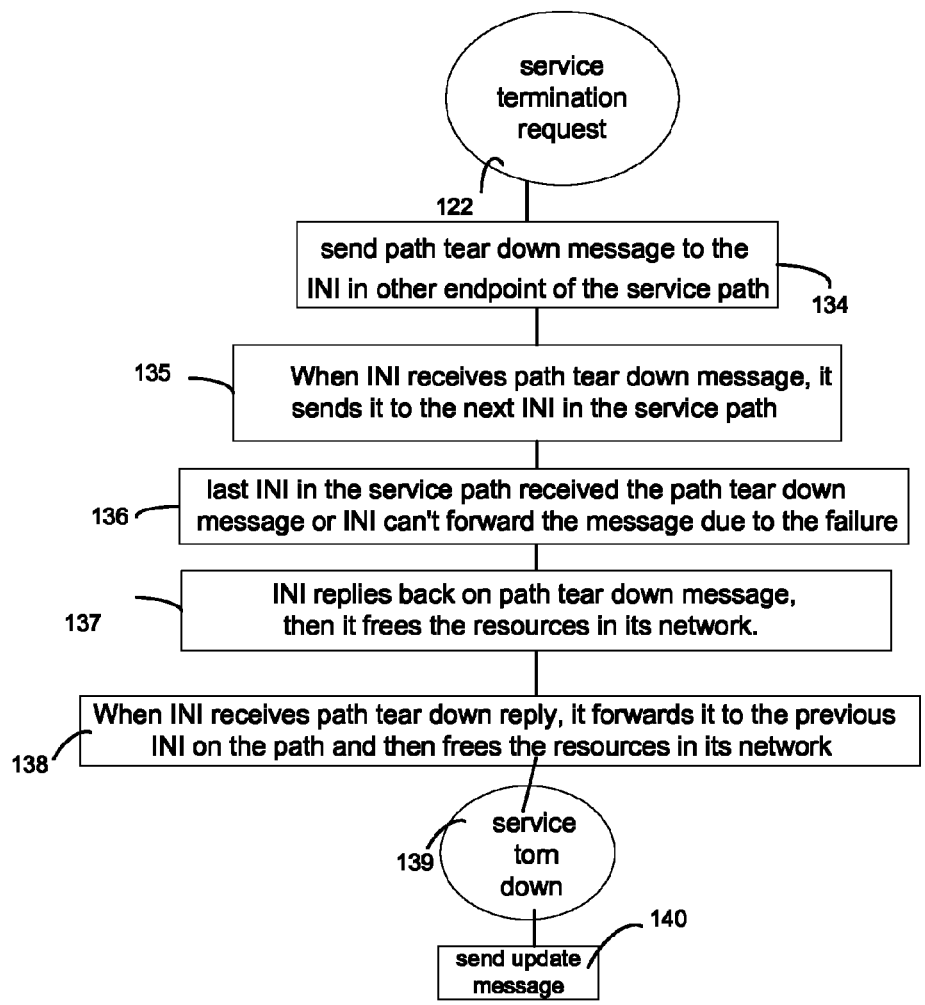
FIGS. 5 and 6 are flowcharts of a process of service tear down upon a service termination request event, and a service failure event or a keep alive timeout event, respectively, according to exemplary embodiments.
Figure 6:
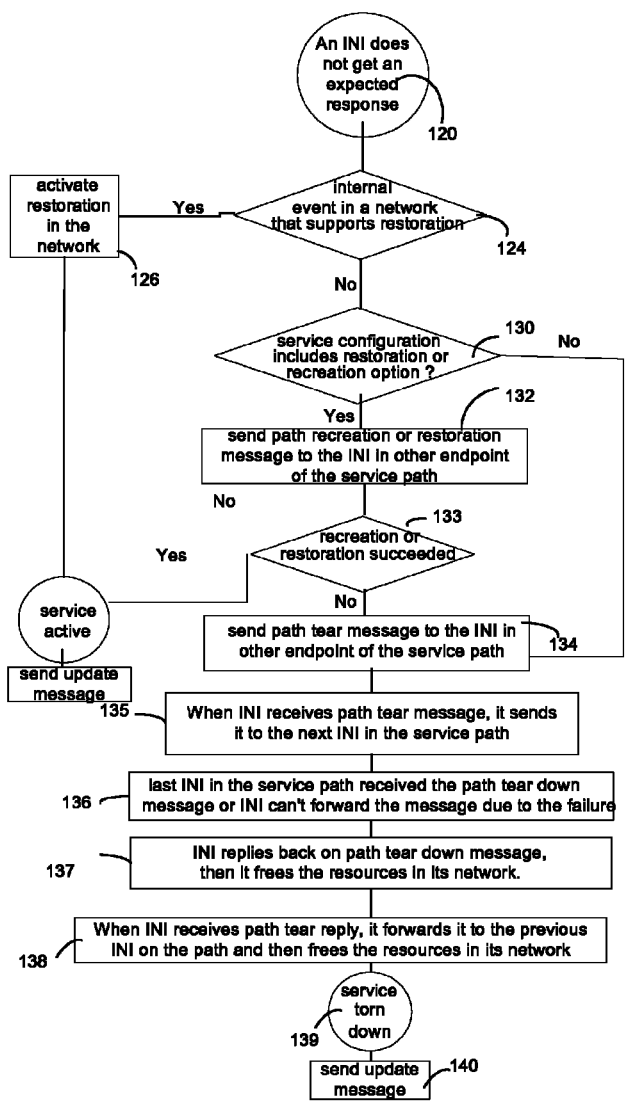

FIGS. 5 and 6 are flowcharts of an exemplary embodiment of a process of service tear down. With reference to FIG. 5, there is shown a process when a service termination request is received (block 122). A service termination request can arrive from OSS, or from the user, or from a source endpoint that requests to tear down a particular service. The INI that receives this request can send a path tear down message over the service path to the INI at the other endpoint of the service path (block 134) via each INI along the path. Each INI that receives a path tear down message sends it to the next INI in the service path (block 135).

When an INI can't forward the path tear down message to the next INI in the path due to service failure, or the message arrives to the last INI in the path (block 136), this INI replies to the previous INI in the path, indicating that the service has been torn down. This INI then frees the resources used in the network for that service (block 137). When the previous INI receives the reply to a path tear down message indicating that the service beyond it has been torn down, it forwards this message to the previous INI in the service path and then frees resources of that service in its network (block 138).

This process iterates all along the path back to the first INI in the path. Both endpoints (if not failed) perform this process of path tear down and resource deletion messages. When both INIs internally delete their resources, the service tear down action is complete (block 139) and an update message can be sent to all INIs (block 140).

Other events can cause the service tear down operation to start, as illustrated in the exemplary embodiment of FIG. 6, for example, when an INI does not receive an expected response from an adjacent INI (block 120). Periodically, each source endpoint and each destination endpoint of a service can send keep-alive messages in order to verify the connectivity of the service path. One event causing tear down can be when keep alive messages do not arrive to an endpoint of a service after a certain timeout. Another type of event causing tear down can be a service failure which is discovered in another fashion, and not by the keep alive mechanism.

When an INI does not receive an expected response from an adjacent INI (block 120), or in case of another service failure event, in a network that has high availability and that supports restoration (block 124), then the network can restore the service using its own internal methods (block 126) and the service becomes active (block 127).

If the network does not support restoration, but the service configuration includes the capability of restoration or recreation of the path (block 130), then the INI can send a path recreate or restore message (block 132) over the service path to the INI at the other end point of the service path. The path recreate message can be handled as a path create message by each INI, except that the resources are already reserved. When the path restore message arrives to an INI then, provided that the restoration is supported in the network, the INI converts the message to an internal request to restore the service (which includes both path and resources allocated to that path) and sends a path recreation or restoration reply back to the previous INI (block 132). If recreation or restoration succeeds (block 133), then the service becomes active (block 127) and an update message is sent to the service end points.

If the service configuration does not include a recreation or restoration option (block 130), or recreation or restoration does not succeed (block 133), then the INI can send a path tear down message over the service path to the INI at the other endpoint of the service path (block 134) and the method can proceed in the same manner as illustrated in FIG. 5.

Figure 7:
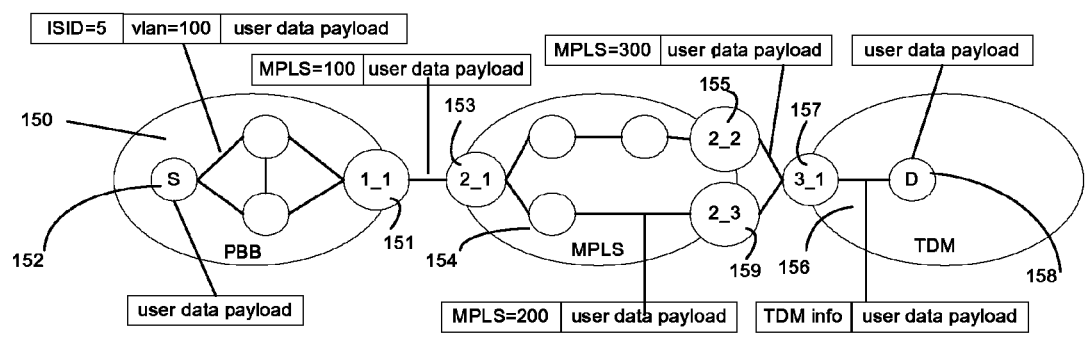
FIG. 7 is a schematic illustration of one example of a point-to-point service request between different networks, according to one embodiment.

FIG. 7 is a schematic illustration of an exemplary embodiment of a point-to-point service request between different networks. Data forwarding in the service can be carried out as follows. First the data is forwarded in the originating network 150 according to the network's internal forwarding protocol. The data arrives at the first INI 151 at its network's border. This first INI 151 converts the destination address from an internal network forwarding address to an external (e.g., inter INI NNI) forwarding address, using the destination GUID, service ID and the inter INI protocol. Then, this INI 151 sends the data to the INI 153 in the next network. The INI 153 in the next network converts the data to the internal format of the second network 154 and sends it inside the network to the next INI 155 on its border. This process iterates until the data reaches its final destination 158.

With further reference to FIG. 7, the inter-INI protocol in the illustrated example is MPLS. (It will be appreciated that other protocols could be adopted, instead.) There is a point-to-point service request from an endpoint S in a PBB (Provider Backbone Bridge) network to D in a TDM (Time Division Multiplexing) network. As an example, suppose the service request has an SLA of guaranteed bandwidth 100 Mb/s. Assume that all links have the same cost and the best path is the one with the minimal number of hops, so as to determine the path of least cost for the service.

- A service request with a service_id=1 and destination GUID 3_1.1 157 is initiated by the source S. First the resource reservation and signaling is done in the PBB domain. The VLAN and I-SID tags are reserved for that service. Then the request arrives to INI 1_1 151 with a path cost=2.
- Since the first field of GUID is already different, the field=3. INI 1_1 151 has an entry regarding that field, therefore it sends a path and resource reservation message PATH=[1_1] and the path cost=3 to INI 2_1 153 using MPLS protocol with an MPLS label reserved for that service.
- For INI 2_1 153, the field=3 and the INI 2_1 (for explanatory purposes) has such an entry. The entry says that the best path to field=3 is through INI 2_3 159. INI 2_1 uses MPLS protocol to reserve resources for the path to INI 2_3 159. The MPLS label in the second network is reserved for that server.
- INI 2_3 159 receives the message, field=3 and there is an entry with such a field for INI 3_1 157 with a path cost=1. INI 2_3 159 sends a path and reservation message to INI 3_1 157 using the inter-INI MPLS protocol With an MPLS label reserved for that service.
- INI 3_1 157 determines that the endpoint 3_1.1 158 is its network. It converts the message to a TDM resource allocation message and sends it to the endpoint D 158.
- The path message now is sent back indicating that the reservation actually was performed.
- The data can be forwarded as follows:
- Source endpoint adds the reserved VLAN and I-SID to the Ethernet packet and sends to INI 1_1.
- INI 1_1 deletes the VLAN and I-SID and adds the MPLS label for the inter-INI protocol.
- INI 2_1 removes the MPLS label for the inter-INI protocol, adds an MPLS label reserved in the second network and sends it to INI 2_3.
- INI 2_3 deletes the MPLS label reserved for the second network, adds an MPLS label reserved for the inter-INI MPLS connection and sends the data to INI 3_1.
- INI 3_1 removes the MPLS label and sends the data according to the allocated TDM slot and trunk to the destination D.

While embodiments described above include service creation from source to destination network entities (point-to-point), it will be appreciated that embodiments can also be utilized for point to multi-point or any-to-any connectivity. According to an exemplary embodiment, if the data plane supports multi-point communication, full-mesh unicast control plane messages can be used.

Some advantages of embodiments described herein include enabling allocation of various SLA profiles, substantially in real time, without a prior resource reservation in the network. Embodiments can support service protection on a control plane level and routing that is dynamic in real-time without pre-computing. Further, in cases where one network wishes to maintain confidentiality from other networks, various options are available to permit automatic routing and switching at the control plane level while preserving confidentiality.

While a limited number of embodiments have been described in detail, it will be appreciated that many variations, modifications and other applications of embodiments can be made. It will further be appreciated that embodiments are not limited to what has been described hereinabove merely by way of example. Furthermore, other embodiments exist that are, for example, combinations and mixtures of aspects and components of various embodiments described herein.

What is claimed is:

1. A method of end-to-end signaling between a first network and a second network, the method comprising:
   identifying a network topology between said first and second network;
   providing a first inter-network interface (INI) at a border between the first network and networks external to the first network;
   providing a second inter-network interface (INI) located at a border between the second network and networks external to the second network;
   signaling a resource request between a source in the first network and a destination in the second network;
   determining availability of an end-to-end path over the topology between said source in the first network and said destination in the second network;
   publishing offered connectivity, path metrics and accounting information between each of said networks, and
   automatically provisioning an end to end telecommunication service over an available end to end path using distributed, in-band signaling, in response to said resource request, wherein the step of provisioning includes conversion of protocol messages from an internal protocol of the first network to an inter network communication protocol and from the inter network communication protocol to an internal protocol of the second network, and wherein the protocol messages include a plurality of control plane messages and data plane messages;
   further comprising providing a global unique hierarchical self describing address from a logical hierarchical addressing scheme corresponding to a hierarchy of the network topology for identifying each network entity by a global unique identifier.

2. The method of claim 1, wherein the resource request includes a network update request;
converting by the second INI includes calculating updated path metrics based on an update message generated by the translating by the first INI; and
forwarding the received resource request to an entity in the second network, comparing path metrics and network capabilities stored for the first network in a connectivity database of the second INI with the updated path metrics and network capabilities translated from the received update message, and, in response to the stored path metrics and network capabilities being different than the updated path metrics and network capabilities, storing the updated path metrics and network capabilities of the first network in the connectivity database of the second INI.

3. The method of claim 1, wherein the resource request includes a service creation request;
receiving by the first INI a service creation template having a destination GUID, a service ID, and a Quality of Service requirement;
converting by the first INI includes generating a path creation message having data mapped from the service creation template to the second format for inter INI communication, a GUID of the first INI, path metrics of a requested path between the first network and the second network, and a tariff for the requested path; and
transmitting the path creation message to a next INI of a next network in the requested service path.

4. The method of claim 3, further comprising:
receiving the transmitted path creation message by the next INI;
determining if the destination GUID in the path creation message is located in the network of the next INI;
in response to the destination GUID not being located in the network of the next INI and the next INI having information regarding the destination GUID, updating by the next INI the path metrics and tariff in the path creation message and transmitting the updated path creation message to another next INI in the requested service path.

5. The method of claim 1, wherein the resource request includes a service teardown request;
the method further comprising:
transmitting the translated service teardown message to a next INI of a next network in a service path that is requested to be torn down; and
receiving the transmitted service teardown message by the next INI;
determining if an endpoint of the service path that is requested to be torn down is located in the network of the next INI; and
in response to the endpoint not being located in the network of the next INI, transmitting the translated service teardown message to another next INI in the service path that is requested to be torn down.

6. The interface device according to claim 1, further comprising:
a first transceiver configured to receive a control message from an entity in a first network, the control message including signaling between the first network and a second network;
a processor configured to access and execute program instructions to translate the control message from a first format used internally in the first network to a second format used to communicate with a second interface device located at a border between the second network and networks external to the second network;
a second transceiver configured to transmit the translated control message to the second interface device; and
a memory configured to store the program instructions.

7. The device of claim 6, wherein the second transceiver is further configured to receive a second control message from the second interface device;
the processor is further configured to execute the program instructions to translate the received second control message from the second format used to communicate with the second interface device to the first format used internally in the first network; and
the first transceiver is further configured to forward the received and translated second control message to a second entity in the first network.

8. The device of claim 6, wherein the control message includes a network update request having a new Global Unique Identifier (GUID);
the processor is further configured to execute program instructions such that the translating includes generating an update message including GUIDs and network capabilities of the first network; and
the second transceiver is further configured such that the transmitting the translated control message includes transmitting the update message to all interface devices in a hierarchy level of the first interface device and a next higher hierarchy level, as determined according to GUIDs of said interface devices.

9. The device of claim 7, wherein the control message includes a network update request;
the processor is further configured to execute program instructions such that the translating the second control message includes calculating updated path metrics based on an update message generated by a second interface device; and
the first transceiver is further configured such that the forwarding the received and translated second control message includes comparing path metrics and network capabilities stored for the second network in a connectivity database stored in the memory with the updated path metrics and network capabilities translated from the received second control message, and, in response to the stored path metrics and network capabilities being different that the updated path metrics and network capabilities, storing the updated path metrics and network capabilities of the second network in the connectivity database in the memory.

10. The device of claim 6, wherein the control message includes a service creation template having a destination GUID, a service ID, and a Quality of Service requirement;
the processor is further configured to execute program instructions such that the translating includes generating a path creation message having data mapped from the service creation template to the second format for inter-interface device communication, a GUID of the interface device, path metrics of a requested path between the first network and the second network, and a tariff for the requested path; and
the second transceiver is further configured such that the transmitting the translated control message includes transmitting the path creation message to a next interface device of a next network in the requested service path.

11. The device of claim 10, wherein the second transceiver is further configured to receive a second path creation message transmitted by the another interface device;
the processor is further configured to execute program instructions to:
determine if a destination GUID in the second path creation message is located in the first network, and,
in response to the destination GUID not being located in the first network and the memory having information regarding the destination GUID, update path metrics and a tariff in the second path creation message; and
the second transceiver is further configured to transmit the updated second path creation message to a next interface device in a second requested service path.

12. The device of claim 6, wherein the control message includes a service teardown request; and
the second transceiver is further configured such that the transmitting the translated service teardown message includes transmitting the message to a next interface device of a next network in a service path that is requested to be torn down.

13. The device of claim 6, wherein the second transceiver is further configured to receive a service teardown message from another interface device;
the processor is further configured to execute program instructions to determine if an endpoint of the service path that is requested to be torn down is located in the first network; and
in response to the endpoint not being located in the first network, the second transceiver is further configured to transmit the service teardown message to a next interface device in the service path that is requested to be torn down.

14. The device of claim 6, wherein the memory is further configured to store authorization and authentication databases having a list of entities permitted to connect to the interface device and to other interface devices.

15. The method of claim 1, wherein the resource request includes a network update request;
receiving by the first INI a new Global Unique Identifier (GUID);
converting by the first INI includes generating an update message having GUIDs and network capabilities of the first network; and
transmitting the update message to all INIs in a hierarchy level of the first INI and a next higher hierarchy level, as determined according to GUIDs of said INIs.

16. The method according to claim 1, wherein the step of providing a second INI includes:
providing the second INI in communication with the first INI; and
the step of automatically provisioning includes:
causing the first INI to request resources, automatically, in-band, from the second INI; and
causing the second INI to automatically respond to the request, in-band to the first INI.

17. The method according to claim 16, further comprising providing an inter-INI protocol for in-band communication between the first and second INIs, the in-band communication including the resources requests and responses to resource requests.

18. The method according to claim 17, wherein the in-band communication includes converting addresses, Quality of Service definitions and protection definitions between a protocol of the first network and a protocol of the second network.

19. The method according to claim 1, wherein the step of provisioning includes updating with a specific address set at least of: forwarding databases of a network switching devices, or routing tables of network switching devices.

20. The method according to claim 16, wherein each of the INIs includes:
at least two interfaces for receiving and transferring signals, at least one of the interfaces for receiving and transferring signals with the network on which border the INI is located; and
a control plane processing mechanism for signaling between INIs.

21. The method according to claim 1, wherein the step of automatically provisioning is carried out in real-time.

22. The method according to claim 1, wherein the step of publishing further includes preparing and transferring a template including defined capabilities of at least one of: one of the first and second networks or a service.

23. An interface device for inter-network communication, the interface device comprising:
at least two interfaces for receiving and transferring signals, at least one of the interfaces for receiving and transferring signals with a network on which border the interface is located; and
a control plane processing mechanism for in-band signaling, wherein the processing includes conversion of protocol messages from an internal protocol of a first network to an inter network communication protocol and from the inter network communication protocol to an internal protocol of a second network, and wherein the protocol messages include a plurality of control plane messages and data plane messages and processing information regarding offered connectivity, path metrics and accounting information between said at least two interfaces;
wherein each network entity is identified by a global unique identifier (GUID) including a global unique hierarchical self describing address from a logical hierarchical addressing scheme corresponding to a hierarchy of the network topology.

24. The interface device according to claim 23, further comprising:
a protocol converter coupled to the at least two interfaces;
a service interface;
a topology manager;
a template generator;
a routing mechanism;
a link state database; and
a template database.

25. The interface device according to claim 24, further comprising an OSS (Operating Support System) interface.

* * * * *